July 13, 1937.     H. E. TAUTZ     2,086,783
SAW TABLE
Original Filed Sept. 27, 1934
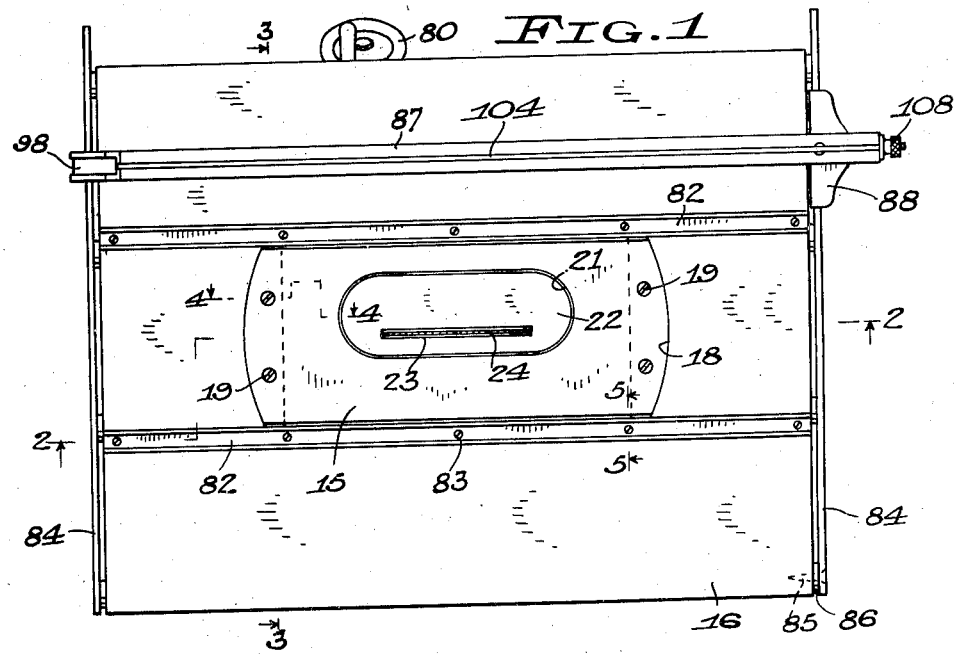
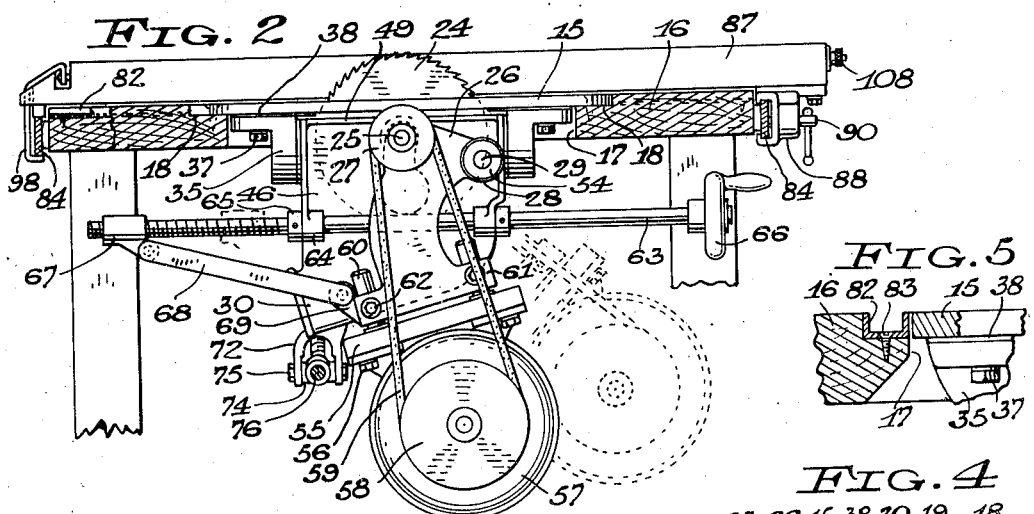
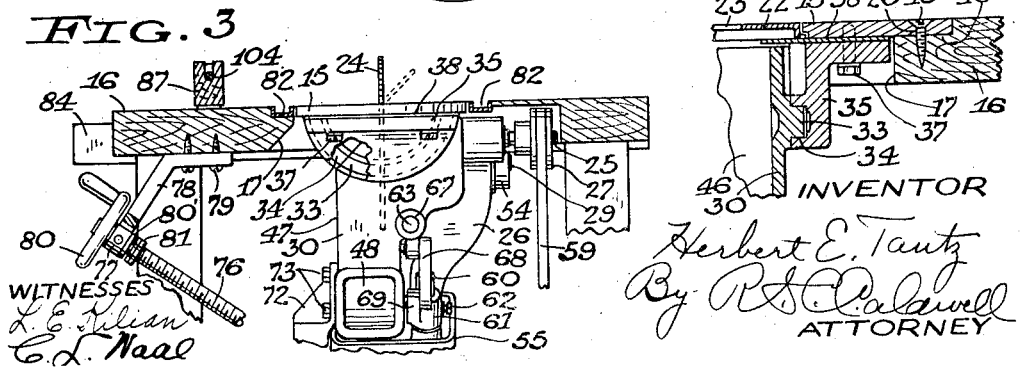
WITNESSES
L. E. Kilian
C. L. Naal
INVENTOR
Herbert E. Tautz
By R. S. Caldwell
ATTORNEY Patented July 13, 1937

2,086,783

UNITED STATES PATENT OFFICE 2,086,783

SAW TABLE

Herbert E. Tautz, Milwaukee, Wis.

Original application September 27, 1934, Serial No. 745,678. Divided and this application August 21, 1935, Serial No. 37,153

3 Claims. (Cl. 143—132)

The invention relates to wood-working machines and more particularly to saw tables.

An object of the invention is to provide means whereby an inexpensive wood-working machine having a wooden table of any desired size can be easily and quickly assembled, and whereby work will be accurately guided on the table.

Another object of the invention is to provide a wood-working machine having a wooden work table with an opening to receive a power tool unit, the wooden table having metal gage-guiding bars which define the sides of the opening.

The invention further consists in the several features hereinafter described and claimed.

This application constitutes a division of my application for Circular saw apparatus, Serial No. 745,678, filed September 27, 1934.

One specific embodiment of the invention is shown in the accompanying drawing, wherein—

Fig. 1 is a top plan view of a circular-saw machine constructed in accordance with the invention;

Fig. 2 is a longitudinal sectional elevation of the machine, taken generally on the line 2—2 of Fig. 1, two different positions of a swingable saw support being shown in full and dotted lines;

Fig. 3 is a transverse sectional elevation taken generally on the line 3—3 of Fig. 1, two different positions of a tiltable saw being shown in full and dotted lines;

Fig. 4 is a sectional view taken on the line 4—4 of Fig. 1, and

Fig. 5 is a sectional view taken on the line 5—5 of Fig. 1.

In the drawing, 15 designates a flat horizontal mounting plate having parallel opposite sides and preferably having rounded opposite ends. The mounting plate is of metal and is intended to be secured to a rectangular wooden saw table or bench 16 of any suitable size, the plate covering an opening 17 in the table and being flush with the upper surface of the table to form a work-supporting surface. The end portions of the plate are set into rabbets 18 in the table and are fastened to the table by screws 19 passing through bores 20 in the plate.

The mounting plate 15 forms part of a power tool unit, here indicated to be a circular-saw unit. An elongated opening 21 is formed in the mounting plate and receives therein in flush relation an insert plate or panel 22 having a slot 23 extending parallel to the side edges of the mounting plate to admit the upper portion of a circular-saw 24. The insert is preferably formed by a soft metal die-casting.

The saw 24 is carried on an arbor 25 rotatably mounted in a swingable member 26 and having a drive pulley 27 at its outer end, the saw table being suitably recessed to clear the pulley, as indicated in Fig. 3. The swingable member 26 has a hub portion 28 pivotally carried on a rod or shaft 29 extending parallel to the saw arbor and secured to a tiltable metal frame or housing 30 forming a sawdust chute, the bottom of the housing sloping to a discharge opening 48. A collar 54 confines the swingable member 26 on the rod 29.

The opposite end walls of the housing 30 have respective arcuate ribs 33 formed thereon and movably fitting in arcuate grooves 34 formed in metal trunnion brackets 35. The trunnion brackets are secured to the under side of the mounting plate 15 by screws 37, and define for the tiltable frame or housing 30 a pivotal axis which preferably lies in the plane of the saw and substantially in the plane of the top surface of the mounting plate.

Sheet metal plates 38 are clamped between the brackets 35 and the mounting plate to form supports for the insert panel 22, the panel being detachably secured to the plates 38 in any suitable manner.

The tiltable frame or housing 30 has parallel side walls 46 and 47 between which the saw is located. At its upper portion the frame or housing 30 is cut away at one side, as seen in Fig. 3, to permit tilting of the frame. The upper portions of the end walls of the frame are extended to form end flanges which are connected at their upper edges by a flange 49 also merging with the upper edge of the adjacent side wall 46 of the frame, thus insuring rigidity. The side wall 46 is suitably apertured to admit the saw arbor 25.

A ribbed plate 55 is adjustably carried by the lower end of the swingable member 26 and has secured thereto by screws 56 an electric motor 57. The motor shaft has a pulley 58 which is drivingly connected to the saw arbor pulley by a V-belt 59. The tension on the belt is adjusted by shifting the plate 55 which, in the present instance, is provided with parallel studs 60 slidably fitting in apertured lugs 61 formed on the lower end of the frame 26, the studs being secured in adjusted position in the lugs by set screws 62.

A horizontal shaft 63 is journalled in lugs 64 formed on the side wall 46 of the tiltable frame 30 and projects beyond each end of the frame, the shaft being retained against axial movement by collars 65 engaging the lugs. One end of the shaft is provided with a hand wheel 66. The other end of the shaft, which is screw-threaded, carries a nut or traveller 67 which is connected by a link 68 with a lug 69 formed on the lower end of the swingable member 26. By turning the hand-wheel 66, the nut 67 is caused to move along the shaft, thereby shifting the swingable member 26 to adjust the projection of the circular saw above the table. The two extreme positions of the swingable assembly are shown by full and dotted lines, respectively, in Fig. 2.

Means are also provided for adjusting the angle of the saw with respect to the saw table. In the present instance, a forked bracket 72 is secured by screws 73 to the lower portion of the side wall 47 of the tiltable frame or housing 30. An internally screw-threaded sleeve 74 is transversely trunnioned in the bracket 72 by screws 75, and is engaged by a threaded shaft 76 which is inclined and may extend toward either side of the table. Near its outer end, the shaft is journalled in a bearing 77 having a swingable mounting on a bracket 78 secured by screws 79 to any suitable part of the saw table or bench, such as the under side of the saw table. A hand-wheel 80 on the outer end of the shaft 76 serves to turn the shaft and thus adjust the angle of the saw, the bearing 77 being placed between the handwheel 80 and a collar 80' on the shaft. The shaft 76 is preferably provided with stop nuts 81 (the upper set being shown) to engage the sleeve 74 and thereby predetermine angular positions of the saw, such as the vertical position and a position 45° from the vertical.

In order to provide durable and accurate guideways for a slidable gage, not shown, a pair of parallel upwardly opening metal channel bars 82 are let into channeled portions of the wooden saw table 16 near and parallel to the opposite side edges of the mounting plate 15 and are secured to the saw table by screws 83. The channel bars preferably define the opposite side edges of the table opening 17 and the rabbets 18, and preferably have a depth equal to the thickness of the mounting plate. This relation facilitates the cutting of the table opening and rabbets, which is effected before the channel bars are applied, and provides straight and durable side edges for the opening and rabbets after the channel bars are secured to the table. The side flanges of each channel bar present at their inner sides longitudinally extending, lateral guide surfaces forming guideways for the gauge.

Metal guide bars 84 extend along the parallel front and rear edges of the table 16 and are secured thereto by screws 85 passing through spacing washers 86. The upper edges of the guide bars 84 are spaced below the plane of the table top to avoid blocking the ends of the channel bars 82, and each guide bar is here indicated to project beyond one of the side edges of the table.

A suitable rip gauge or fence is mounted on the guide bars 84 and in the present instance comprises a wooden fence bar 87 secured at its front end to a metal head or bracket 88 slidably embracing the front guide bar, the bracket being releasably clamped to this guide bar by a clamping screw 90. Preferably, the fence bar is also releasably clamped to the rear guide bar 84, as by means of a metal clamping member 98 having a cam engagement with the fence bar and operated from the front of the machine by a rod 104 extending along the fence bar and provided with a thumb-screw 108 at its front end.

In assembling the machine it is only necessary for the user to obtain the power tool unit and the various metal fittings and to provide a rectangular wooden saw table of any desired size having recesses to receive the mounting plate 15 and channel bars 82, the several parts being readily secured in place. The power tool unit and other metal parts are capable of accurate and economical factory production, while the table is of such character that it can be inexpensively constructed by the user or by a local mill. The mounting plate is detachable from the housing 30 and may be used as a guide for cutting the opening 17 and rabbets 18 in the saw table. The mounting plate is then secured to the saw table and the housing-supporting brackets 35 are subsequently attached to the plate. The channel bars 82 are cut off, if necessary, to suit the length of the table. The shaft 76 may extend toward either side of the table to suit the convenience of the user. The guide bars 84 are secured to the opposite end edges of the saw table, and the wooden fence bar 87 is secured to its metal fittings to form the complete fence.

Since the saw arbor and motor are both carried by the same shiftable member, the belt tension and relative position of the pulleys are not disturbed when the saw adjustments are effected, and the user has unobstructed access to all sides of the table.

The rounded shape of the mounting plate ends and the table rabbets prevents catching of the front edge of the work as the work is fed to the saw. The rounded ends of the mounting plate are preferably defined by arcs of a circle, the center of which is at the center of the plate, so as to permit a slight angular adjustment of the plate about this center without binding against the table or changing the fit of the plate ends with respect to the table rabbets. The side edges of the mounting plate are slightly spaced from the channel bars 82 or side edges of the table opening to permit the angular adjustment of the plate. This adjustment of the plate serves to place the plane of the saw in parallel relation to the channel bars.

The invention provides means whereby a woodworking machine of composite wood and metal construction can be economically built and easily and quickly assembled.

What I claim as new and desire to secure by Letters Patent is:

1. In a wood-working machine, the combination of a wooden work table having an opening and parallel channels in the table top at opposite sides of said opening, a power tool unit secured to said table and having a cutter projecting through said opening, and a pair of parallel metal bars secured in said channels and having longitudinally extending, lateral guide surfaces forming gauge-guiding ways, said metal bars defining the opposite sides of said opening.

2. In a wood-working machine, the combination of a wooden work table having an opening and having rabbets at the opposite ends of said opening, a power tool unit having a cutter projecting through said opening and having a mounting plate resting on said rabbets, and a pair of parallel metal bars secured in the top of the table on opposite sides of said opening and having longitudinally extending, lateral guide surfaces forming gauge-guiding ways, said metal bars defining the opposite sides of said opening and rabbets.

3. In a wood working machine, the combination of a wooden work table having an opening and a channel in the table top at a side of said opening, a power tool unit secured to said table and having a cutter projecting through said opening, and a metal bar secured in said channel and having longitudinally extending, lateral guide surfaces forming gauge-guiding ways, said metal bar defining said side of said opening.

HERBERT E. TAUTZ.